(12) United States Patent
Tang et al.

(10) Patent No.: US 11,194,195 B2
(45) Date of Patent: Dec. 7, 2021

(54) SCREEN ASSEMBLY AND ELECTRONIC DEVICE

(71) Applicant: GUANGDONG OPPO MOBILE TELECOMMUNICATIONS CORP., LTD., Guangdong (CN)

(72) Inventors: Yimei Tang, Guangdong (CN); Jiao Cheng, Guangdong (CN); Zhibin Ouyang, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/952,716

(22) Filed: Nov. 19, 2020

(65) Prior Publication Data
US 2021/0072574 A1    Mar. 11, 2021

Related U.S. Application Data

(63) Continuation-in-part of application No. PCT/CN2018/092892, filed on Jun. 26, 2018.

(51) Int. Cl.
*G02F 1/1339* (2006.01)
*G02F 1/1362* (2006.01)

(52) U.S. Cl.
CPC ...... *G02F 1/1339* (2013.01); *G02F 1/136209* (2013.01); *G02F 1/136286* (2013.01); *G02F 2202/28* (2013.01)

(58) Field of Classification Search
None
See application file for complete search history.

(56) References Cited

U.S. PATENT DOCUMENTS

2010/0315570 A1* 12/2010 Mathew ............... G06F 1/1601
349/58
2014/0063356 A1* 3/2014 Liao ................... H04M 1/0264
349/2
(Continued)

FOREIGN PATENT DOCUMENTS

| CN | 103823319 A | 5/2014 |
|---|---|---|
| CN | 103458073 B | 12/2015 |

(Continued)

OTHER PUBLICATIONS

International search report with English Translation issued in corresponding international application No. PCT/CN2018/092892 dated Mar. 4, 2019.
(Continued)

*Primary Examiner* — Richard H Kim
(74) *Attorney, Agent, or Firm* — Young Basile Hanlon & MacFarlane, P.C.

(57) ABSTRACT

A screen assembly and an electronic device are provided according to the disclosure. The screen assembly includes a backlight module, a display panel, a camera module, and a light shielding member. The backlight module is stacked with the display panel and defines a mounting through hole for at least partially receiving the camera module. The light shielding member is sandwiched between the backlight module and the display panel and defines a first through hole through which the camera module extends. The light shielding member is configured to block light leakage of the display panel and the backlight module toward the camera module.

17 Claims, 14 Drawing Sheets

(56) References Cited

U.S. PATENT DOCUMENTS

2016/0161664 A1 6/2016 Ishida et al.
2017/0090228 A1 3/2017 Ishikawa et al.
2019/0243427 A1* 8/2019 Nakamura ............ G06F 1/1686

FOREIGN PATENT DOCUMENTS

| CN | 105431753 A | 3/2016 |
| CN | 107707695 A | 2/2018 |
| CN | 107784989 A | 3/2018 |
| CN | 207264062 U | 4/2018 |
| CN | 108540603 A | 9/2018 |

OTHER PUBLICATIONS

Extended European Search Report for EP Application 18924091.4 dated Mar. 12, 2021. (10 pages).
Chinese First Office Action with English Translation for CN Application 201880092261.7 dated Jun. 2, 2021. (21 pages).

* cited by examiner

SCREEN ASSEMBLY AND ELECTRONIC DEVICE

CROSS-REFERENCE TO RELATED APPLICATION(S)

This application is a continuation-in-part of International Application No. PCT/CN2018/092892, filed on Jun. 26, 2018, the disclosure of which is hereby incorporated by reference in its entirety.

TECHNICAL FIELD

This disclosure relates to the technical field of electronics, and more particularly, to a screen assembly and an electronic device.

BACKGROUND

An electronic device with a high screen-to-body ratio has a greater proportion of display region and provides users with a better experience. Currently, research and development in increasing the screen-to-body ratio of the electronic device are conducted by mainstream manufacturers. In order to obtain a higher screen-to-body ratio, when defining a hole in a screen for mounting a camera module, the hole is designed to have a small diameter. However, the size of the hole affects the field of view of the camera module. That is, the hole with a decreased diameter will block the field of view and thereof affect shooting of the camera module.

SUMMARY

A screen assembly is provided according to the disclosure. The screen assembly includes a backlight module, a display panel, a camera module, and a light shielding member. The backlight module is stacked with the display panel and defines a mounting through hole for at least partially receiving the camera module. The light shielding member is sandwiched between the backlight module and the display panel and defines a first through hole through which the camera module extends. The light shielding member is configured to block light leakage of the display panel and the backlight module toward the camera module.

A screen assembly is further provided according to the disclosure. The screen assembly includes a backlight module, a display panel, a camera module, and a light shielding member. The display panel includes a display region, and the backlight module and the camera module are disposed corresponding to the display region. The backlight module defines a mounting through hole for at least partially receiving the camera module. The light shielding member is sandwiched between the light shielding member and the display panel. The light shielding member is disposed corresponding to the display region of the display panel and configured to block light leakage of the display panel and the backlight module toward the camera module.

An electronic device is further provided according to the disclosure. The electronic device includes the above-mentioned screen assembly.

BRIEF DESCRIPTION OF DRAWINGS

To describe technical solutions in the implementations of the disclosure more clearly, the following briefly introduces the accompanying drawings required for describing the implementations. Apparently, the accompanying drawings in the following description merely illustrate some implementations of the disclosure. Those of ordinary skill in the art may also obtain other accompanying drawings based on these provided herein without creative efforts.

DETAILED DESCRIPTION

Technical solutions in implementations of the disclosure are clearly and completely described in the following with reference to the accompanying drawings. Apparently, the described implementations are merely a part of rather than all of the implementations of the disclosure. All other implementations obtained by those of ordinary skill in the art based on the implementations provided herein without creative efforts shall fall within the scope of the disclosure.

Figure 1A:
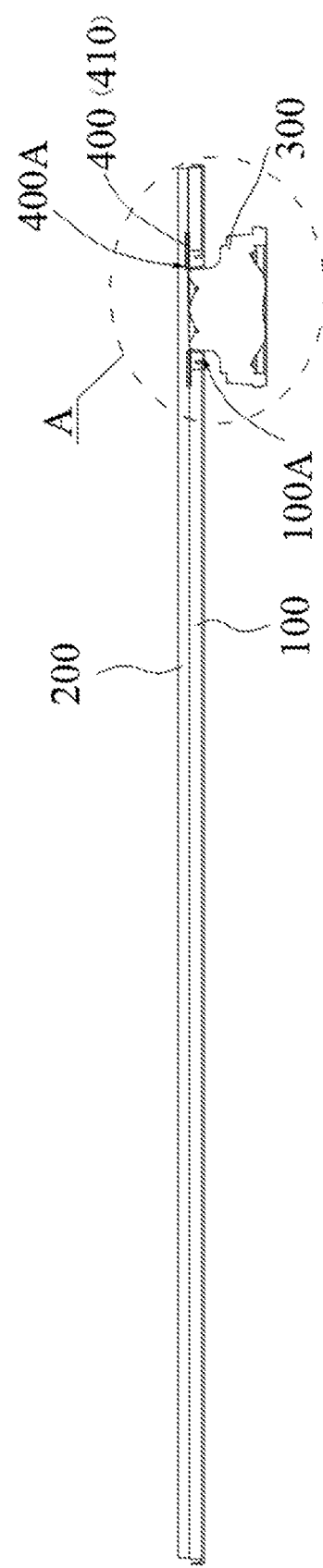
FIG. 1A is a schematic structural view of a screen assembly according to an implementation of the disclosure.
Figure 1B:
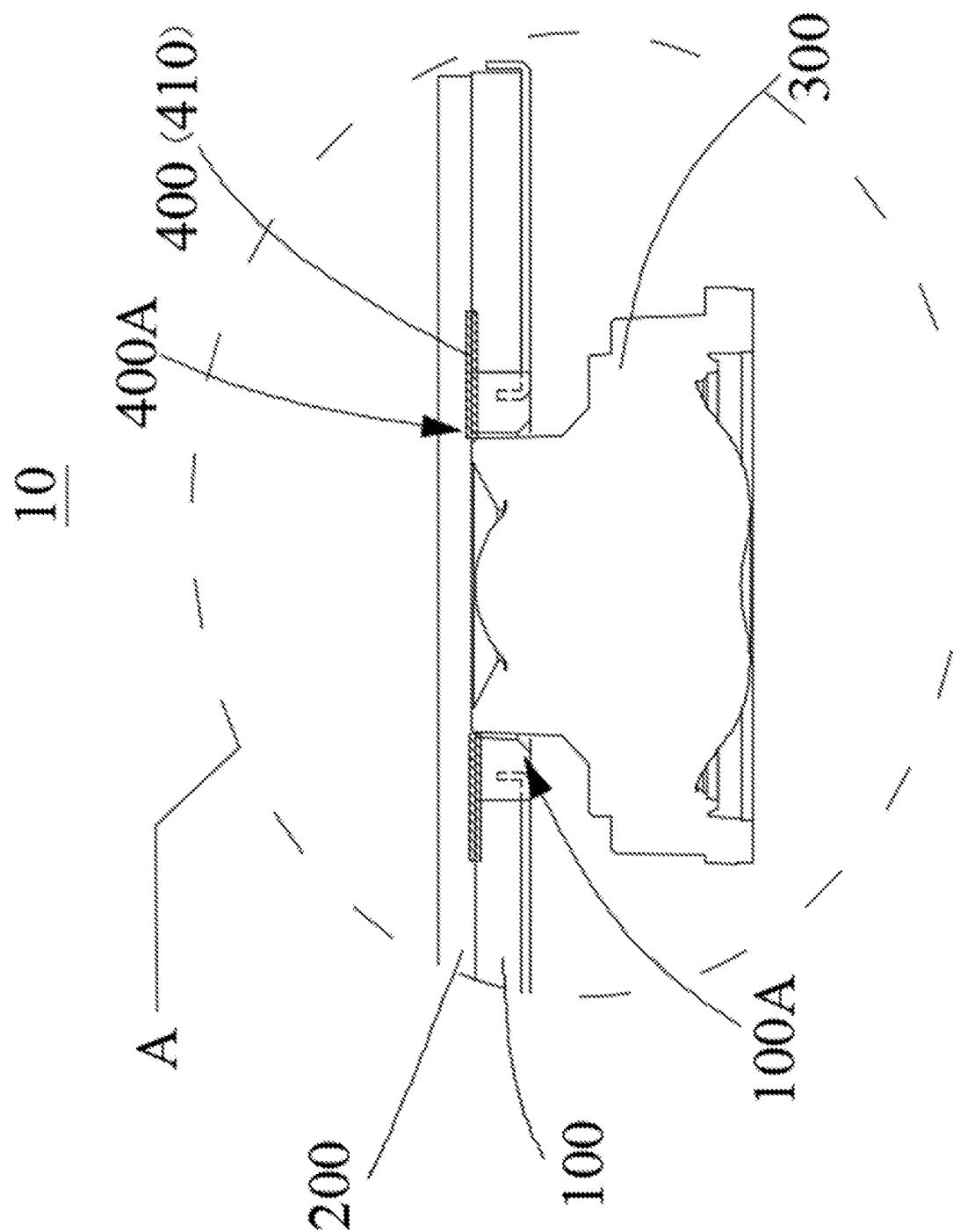
FIG. 1B is an enlarged schematic view of region A illustrated in FIG. 1A.

FIG. 1A is a schematic structural view of a screen assembly according to an implementation of the disclosure, FIG. 1B is an enlarged schematic view of region A illustrated in FIG. 1A. In this implementation, the screen assembly 10 includes a backlight module 100, a display panel 200, a camera module 300, and a light shielding member 400. The backlight module 100 is stacked with the display panel 200. The backlight module 100 defines a mounting through hole 100A for at least partially receiving the camera module 300. The light shielding member 400 is sandwiched between the backlight module 100 and the display panel 200. The light shielding member 400 defines a first through hole 400A. The camera module 300 extends through the first through hole 400A. The light shielding member 400 is configured to block light leakage of the display panel 200 and the backlight module 100 toward the camera module 300.

In an implementation, the display panel 200 is a liquid crystal display panel. The camera module 300 is a front camera.

Figure 1C:
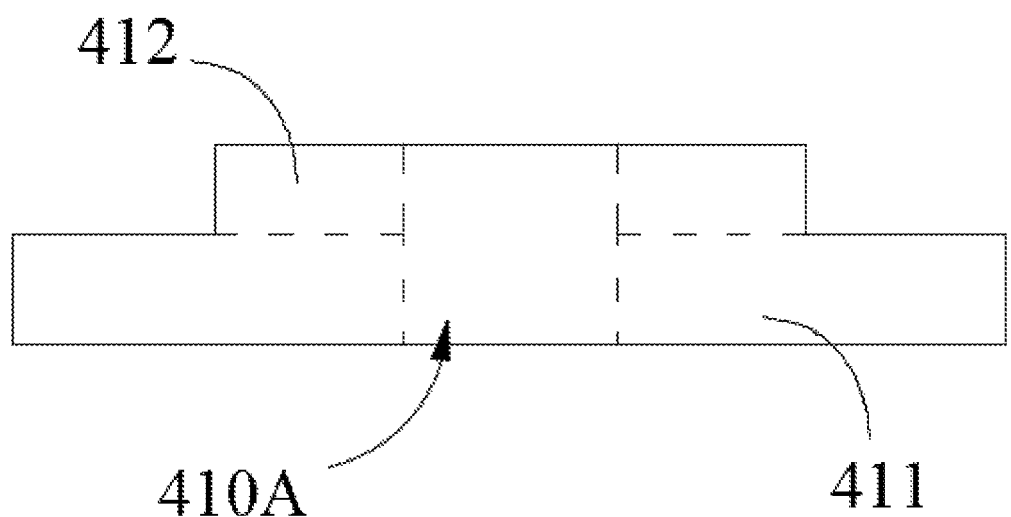
FIG. 1C is a schematic structural view of a light shielding member illustrated in FIG. 1A.

FIG. 1C is a schematic structural view of a light shielding member 400 illustrated in FIG. 1A. In an implementation, the light shielding member 400 includes a light shielding adhesive 410. The light shielding adhesive 410 is used to block the transmission of light. As an option, the light shielding adhesive 410 is a black adhesive. The light shielding adhesive 410 includes an adhesive body 411. The adhesive body 411 is used for bonding the backlight module 100 and the display panel 200. In an implementation, the adhesive body 411 is coated on a surface of the backlight module 100 close to the display panel 200. In another implementation, the adhesive body 411 is coated on a surface of the display panel 200 close to the backlight module 100.

The light shielding adhesive 410 includes, in addition to the adhesive body 411, a protrusion portion 412 in an annular shape extending from a surface of the adhesive body 411. The protrusion portion 412 is disposed on a side of the adhesive body 411 away from the backlight module 100. The light shielding adhesive 410 defines a first via 410A extending through the protrusion portion 412 and the adhesive body 411. The protrusion portion 412 is sleeved on the camera module 300 and attached to a side wall of the camera module 300. On the one hand, the light shielding adhesive 410 can bond the backlight module 100 and the display panel 200 together, and can shield structures inside the backlight module 100, which is conductive to the aesthetics of the screen assembly 10. On the other hand, the light shielding adhesive 410 is configured to block the light leakage of the display panel 200 and the backlight module 100 toward the camera module 300, it helps to increase the field of view of the camera module 300. Furthermore, when the light shielding adhesive 410 is located corresponding to a display region of the display panel 200, it helps to increase a screen-to-body ratio of the screen assembly 10. In an implementation, when the light shielding adhesive 410 is located at a position corresponding to the display region of the display panel 200, there is no need to reserve an area for the light shielding adhesive 410 in a non-display region of the display panel 200, thus reducing an area of the non-display region of the display panel 200 and therefore increasing a screen-to-body ratio of the screen assembly 10.

In the screen assembly 10 provided according to the disclosure, the light shielding member 400 is sandwiched between the backlight module 100 and the display panel 200. The shielding member 400 defines the first through hole 400A. The camera module 300 extends through the first through hole 400A. The shielding member 400 is configured to block the light leakage from the display panel 200 and the backlight module 100 toward the camera module 300. As such, it is possible to reduce interference of the display panel 200 and the backlight module 100 to the camera module 300, increase the field of view of the camera module 300, and ensure shooting quality of the camera module 300. Furthermore, the light shielding member 400 is sandwiched between the display panel 200 and the backlight module 100, which is beneficial to increase the screen-to-body ratio of the screen assembly 10.

Figure 2A:
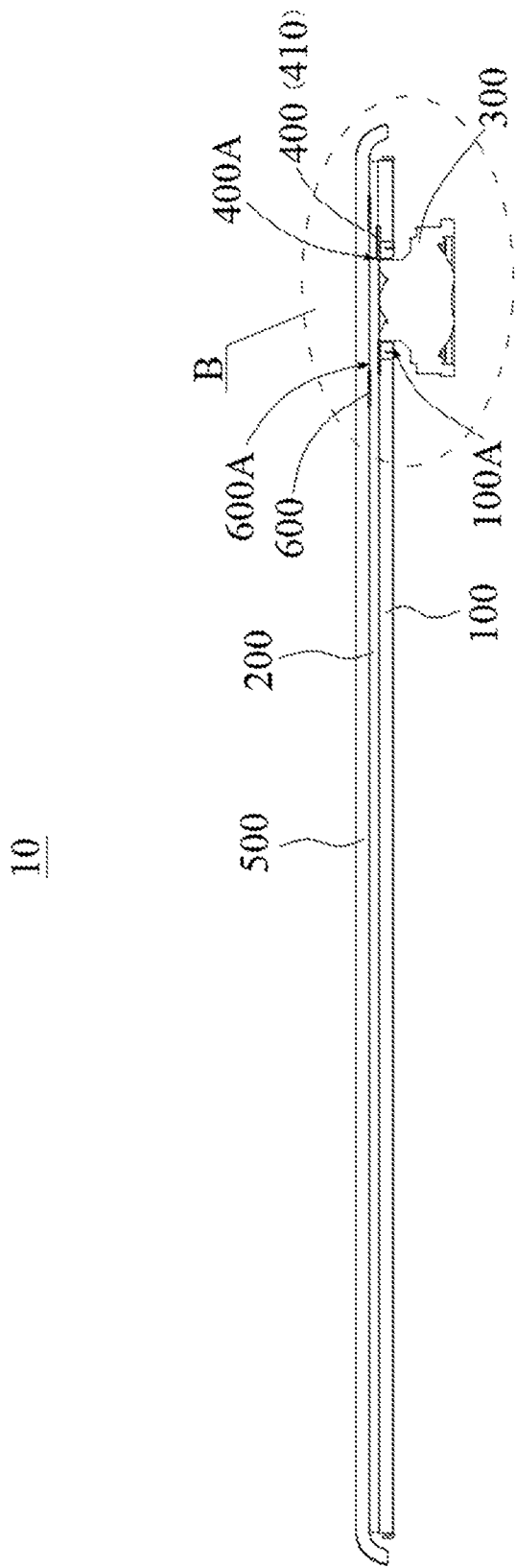
FIG. 2A is a schematic structural view of a screen assembly according to an implementation of the disclosure.
Figure 2B:
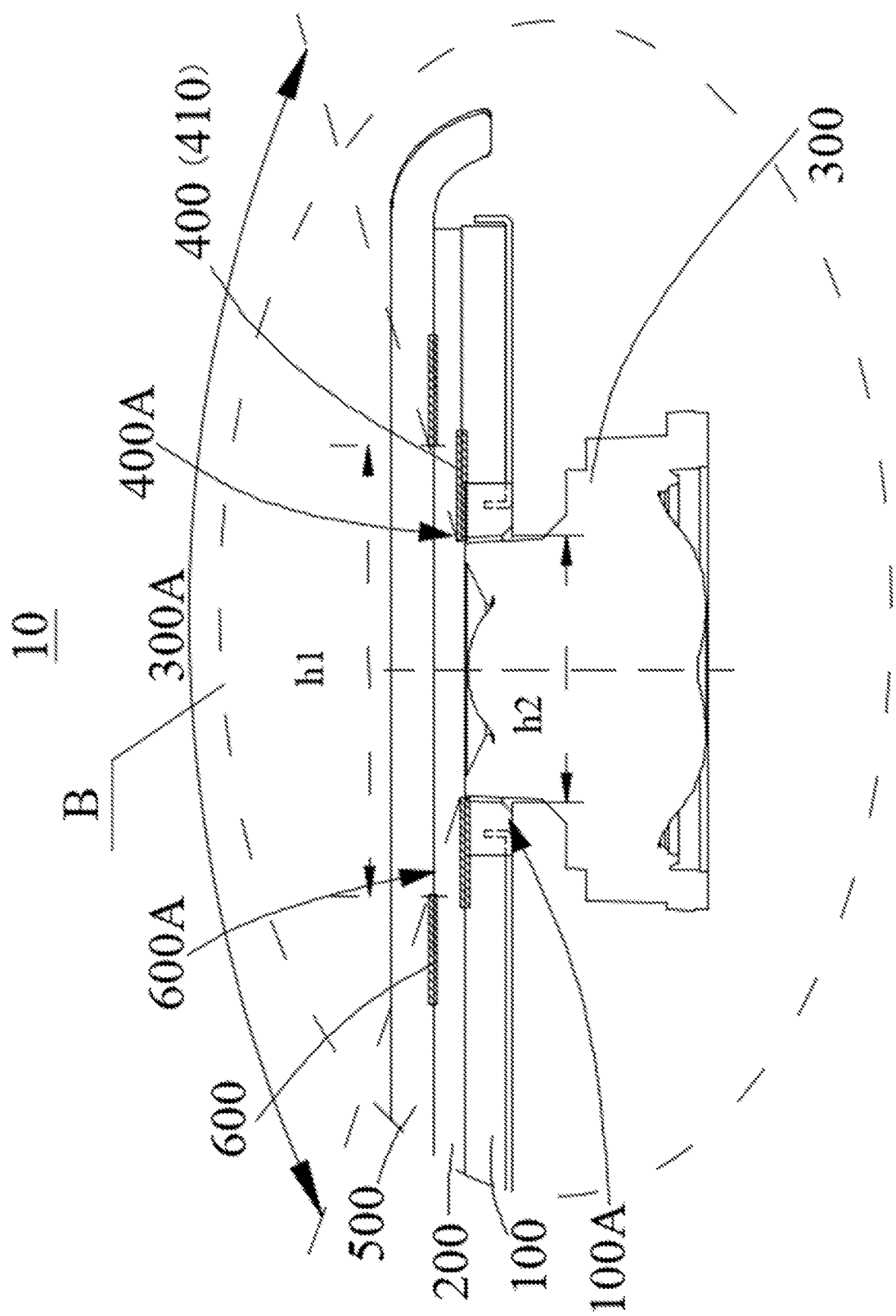
FIG. 2B is an enlarged schematic view of region B illustrated in FIG. 2A.

FIG. 2A is a schematic structural view of the screen assembly 10 according to an implementation of the disclosure. FIG. 2B is an enlarged schematic view of region B illustrated in FIG. 2A. The screen assembly 10 in FIG. 2A is substantially identical with the screen assembly 10 in FIG. 1A in structure, except in the screen assembly 10 in FIG. 2A, the screen assembly 10 further includes a cover plate 500 and an ink layer 600. The ink layer 600 is sandwiched between the display panel 200 and the cover plate 500. The ink layer 600 defines a second through hole 600A. The ink layer 600 is used to shield wires in the display panel 200.

In an implementation, the ink layer 600 is used for blocking transmission of light.

In an implementation, the camera module 300 has a light incident region 300A, and the light incident region 300A is conical in shape. As illustrated in FIG. 2B, the ink layer 600 and the shielding member 400 are respectively located at an edge of the light incident region 300A. The second through hole 600A of the ink layer 600 and the first through hole 400A of the shielding member 400 are respectively attached to a boundary of the light incident region 300A. The ink layer 600 and the shielding member 400 will not block external light from entering the camera module 300, as a result, the camera module 300 can obtain a larger field of view, it helps to improve shooting performance of the camera module 300.

In an implementation, the ink layer 600 has a thickness less than the light shielding adhesive 410.

In this implementation, the ink layer 600 is sandwiched between the display panel 200 and the cover plate 500, and mainly used for shielding the wires in the display panel 200. The ink layer 600 can also be used to block the light leakage of the backlight module 100 and the display panel 200 toward the camera module 300, and shield the structures inside the backlight module 100, so as to prevent the internal structures from being visible to users and affecting the aesthetics and consistency in appearance of the screen assembly 10. To this end, the ink layer 600 can have a thickness less than a preset value. The light shielding adhesive 410 is sandwiched between the display panel 200 and the backlight module 100. One the one hand, the light shielding adhesive 410 can bond the backlight module 100 and the display panel 200 together, and can shield the structures inside the backlight module 100, which is conductive to the aesthetics of the screen assembly 10. On the other hand, the light shielding adhesive 410 is used for blocking the light leakage of the backlight module 100 and the display panel 200 toward the camera module 300, which helps to increase the field of view of the camera module 300. To this end, the light shielding adhesive 410 can have a thickness greater than the preset value to bond the backlight module 100 and the display panel 200 together more firmly.

In an implementation, the second through hole 600A is aligned with the first through hole 400A. A diameter h1 of the second through hole 600A is greater than a diameter h2 of the first through hole 400A.

In an implementation, since the camera module 300 is symmetrical in structure, when the second through hole 600A is aligned with the first through hole 400A, on the one hand, it is possible to ensure that the second through hole 600A and the first through hole 400A will not block the external light from entering the camera module 300 and as a result, the camera module 300 can have a larger field of view; on the other hand, it is possible to further decrease the size of the light shielding adhesive 410 and the ink layer 600, helping to reduce a proportion of the light-shield adhesive 410 and the ink layer 600 occupying the display panel 200, and in turn helping to increase the screen-to-body ratio of the screen assembly 10.

In an implementation, the field of view of the camera module 300 is conical in shape, which diverges from the camera module 300 toward a direction away from the display panel 200. Therefore, when the diameter h1 of the second through hole 600A is greater than the diameter h2 of the first through hole 400A, it is possible to ensure that the ink layer 600 will not block the external light from entering the camera module 300. At the same time, the ink layer 600 can also reduce the light leakage of the display panel 200 toward the camera module 300 as well as shield metal wires and the like in the display panel 200. As such, on the one hand, the camera module 300 can have a larger field of view. On the other hand, since the metal wires in the display panel 200 are shielded, internal structures of the display panel 200 are invisible to the users when viewing from the outside of the screen assembly 10, and thus the consistency in the appearance of the screen assembly 10 is improved.

In another implementation, a projection of the ink layer 600 on the cover plate 500 partially overlaps with a projection of the light shielding adhesive 410 on the cover plate 500. In yet another implementation, the projection of the ink layer 600 on the cover plate 500 at least partially overlaps with the projection of the light shielding adhesive 410 on the cover plate 500.

In this implementation, when the projection of the ink layer 600 on the cover plate 500 partially overlaps with the projection of the light shielding adhesive 410 on the cover plate 500, on the one hand, it is possible to ensure that structures below the light shielding adhesive 410 and the ink layer 600 are completely shielded, which can provide a beautiful and neat appearance of the screen assembly 10; on the other hand, the light shielding adhesive 410 and the ink layer 600 cooperate with each other to reduce the light leakage of the display panel 200 and the backlight module 100 toward the camera module 300, helping to improve shooting performance of the camera module 300.

In another implementation, the ink layer 600 is disposed on a surface of the cover plate 500 close to the display panel 200, that is, the ink layer 600 is coated on the cover plate 500. On the one hand, the ink layer 600 can block the light leakage of the display panel 200 and the backlight module 100 toward the camera module 300, and on the other hand, the ink layer 600 can block light reflected by the display panel 200, the backlight module 100, and the camera module 300 from passing through the cover plate 500. If the light reflected by the display panel 200, the backlight module 100, and the camera module 300 passes through the cover plate 500 to enter eyes of the user, internal structures of the screen assembly 10 are visible to the user, which is unfavorable for the aesthetics and the consistency in the appearance of the screen assembly 10.

Alternatively, the ink layer 600 is disposed on a surface of the display panel 200 close to the cover plate 500, that is, the ink layer 600 is coated on the display panel 200. On the one hand, the ink layer 600 can block the light leakage of the display panel 200 and the backlight module 100 toward the camera module 300, and on the other hand, the ink layer 600 can block the light reflected by the display panel 200, the backlight module 100, and the camera module 300 from passing through the cover plate 500. If the light reflected by the display panel 200, the backlight module 100, and the camera module 300 passes through the cover plate 500 to enter the eyes of the user, the internal structures of the screen assembly 10 are visible to the user, which is unfavorable for the aesthetics and the consistency in the appearance of the screen assembly 10.

In an implementation, the light shielding member 400 is disposed on the surface of the display panel 200 close to the backlight module 100. When the light shielding member 400 is the light shielding adhesive 410, the light shielding adhesive 410 is coated on the surface of the display panel 200. On the one hand, the light shielding adhesive 410 can block the light leakage of the backlight module 100 toward the camera module 300, and on the other hand, the light shielding adhesive 410 can block the light reflected by the backlight module 100 and the camera module 300 from passing through the cover plate 500. If the light reflected by the backlight module 100 and the camera module 300 passes through the display panel 200 and the cover plate 500 and enters the eyes of the user, the internal structures of the screen assembly 10 are visible to the user, which is unfavorable for the aesthetics and the consistency in the appearance of the screen assembly 10.

Alternatively, the light shielding member 400 is disposed on the surface of the backlight module 100 close to the display panel 200. When the light shielding member 400 is the light shielding adhesive 410, the light shielding adhesive 410 is coated on the surface of the backlight module 100. On the one hand, the light shielding adhesive 410 can block the light leakage of the backlight module 100 toward the camera module 300, and on the other hand, the light shielding adhesive 410 can block the light reflected by the backlight module 100 and the camera module 300 from passing through the cover plate 500. If the light reflected by the backlight module 100 and the camera module 300 passes through the display panel 200 and the cover plate 500 and enters the eyes of the user, the internal structures of the screen assembly 10 are visible to the user, which is unfavorable for the aesthetics and the consistency in the appearance of the screen assembly 10.

Figure 3:
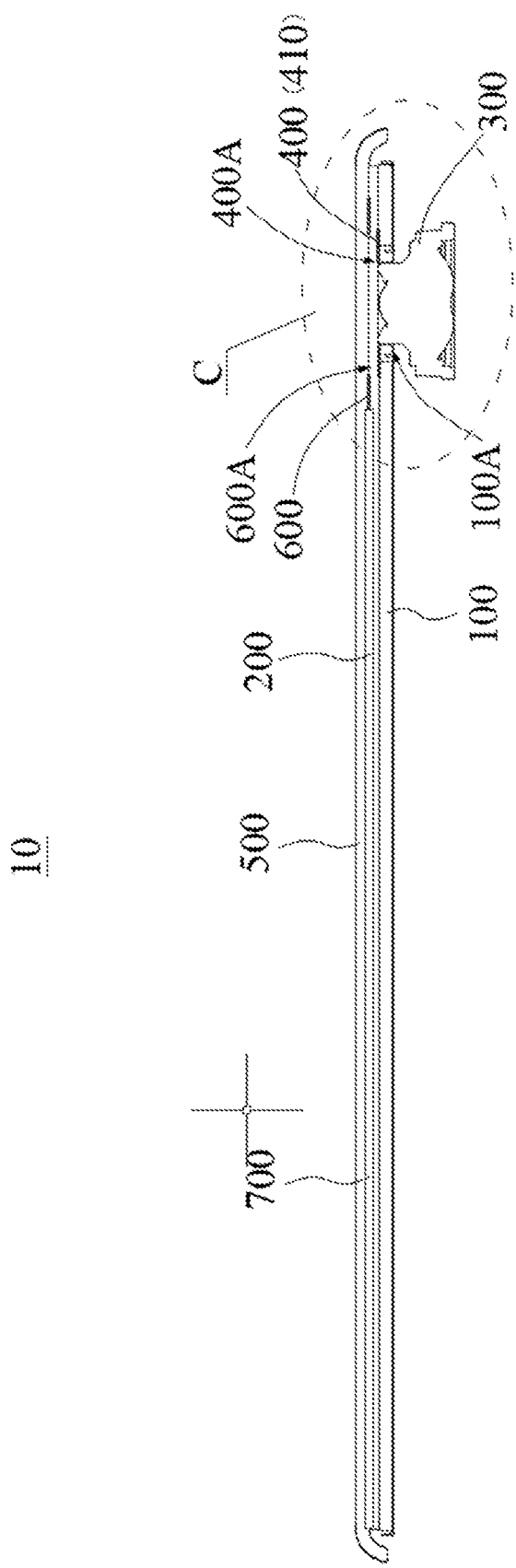
FIG. 3 is a schematic structural view of a screen assembly according to an implementation of the disclosure.

FIG. 3 is a schematic structural view of the screen assembly 10 according to an implementation of the disclosure. The screen assembly 10 in FIG. 3 is substantially identical with the screen assembly 10 in FIG. 2A in structure, except in the screen assembly 10 in FIG. 3, an optically clear adhesive (OCA) 700 is sandwiched between the cover plate 500 and the display panel 200. The optically clear adhesive 700 is used for fixedly connecting the cover plate 500 and the display panel 200.

The optically clear adhesive 700 is a special adhesive used for bonding transparent optical elements. The OCA has advantages of high clarity, high light transmittance (a total light transmittance is greater than 99%), high adhesion, high weather resistance, water resistance, high temperature resistance, ultra violet (UV) resistance and the like. The OCA is a layer of special double-sided adhesive with optical transparency and no substrate. The optically clear adhesive 700, which is sandwiched between the cover plate 500 and the display panel 200, can fixedly connect the cover plate 500 and the display panel 200, and can achieve sealing to protect the display panel 200 from water and dust.

In an implementation, the optically clear adhesive 700 is coated on the surface of the cover plate 500 close to the display panel 200. In another implementation, the optically clear adhesive 700 is coated on the surface of the display panel 200 close to the cover plate 500.

Figure 4A:
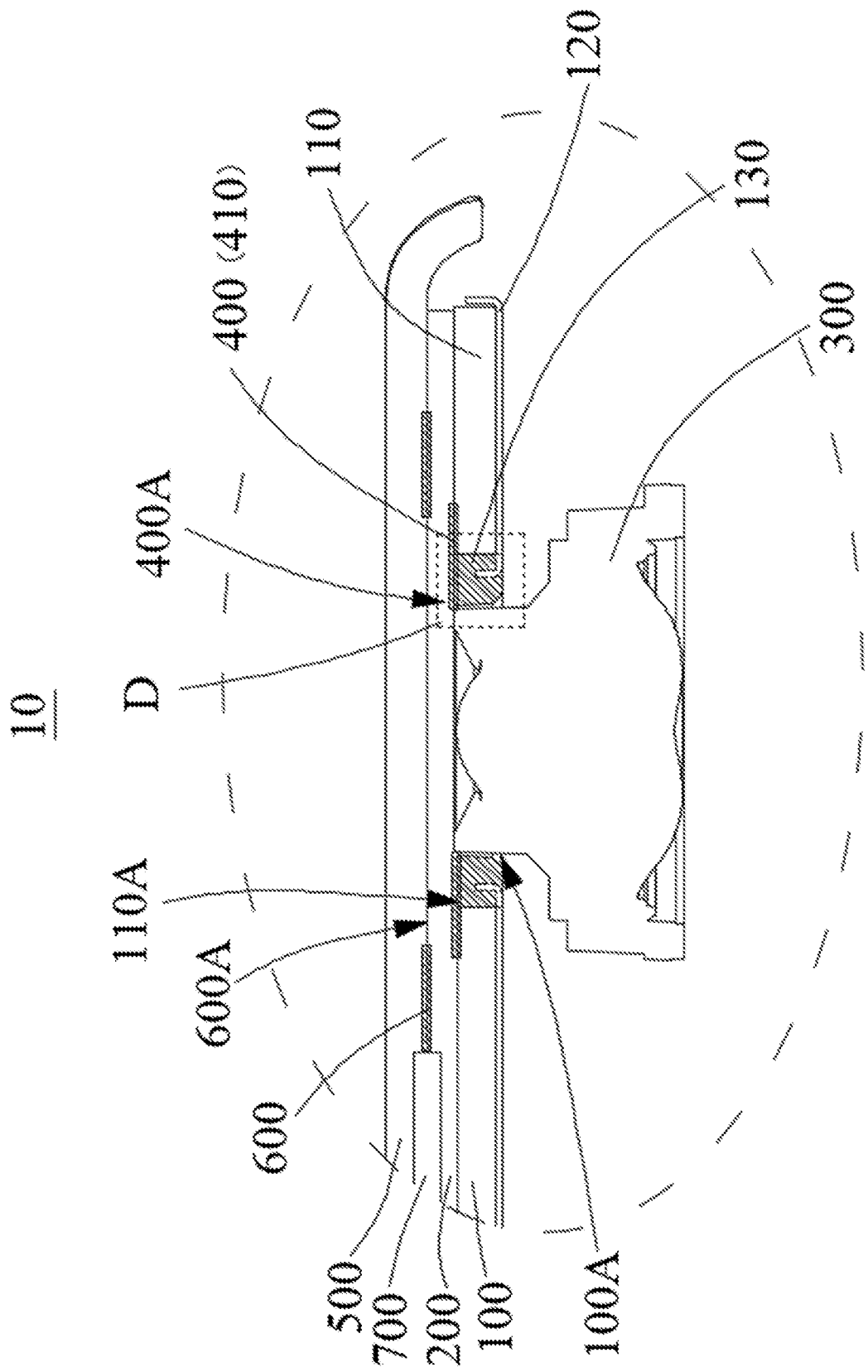
FIG. 4A is an enlarged schematic view of region C illustrated in FIG. 3.
Figure 4B:
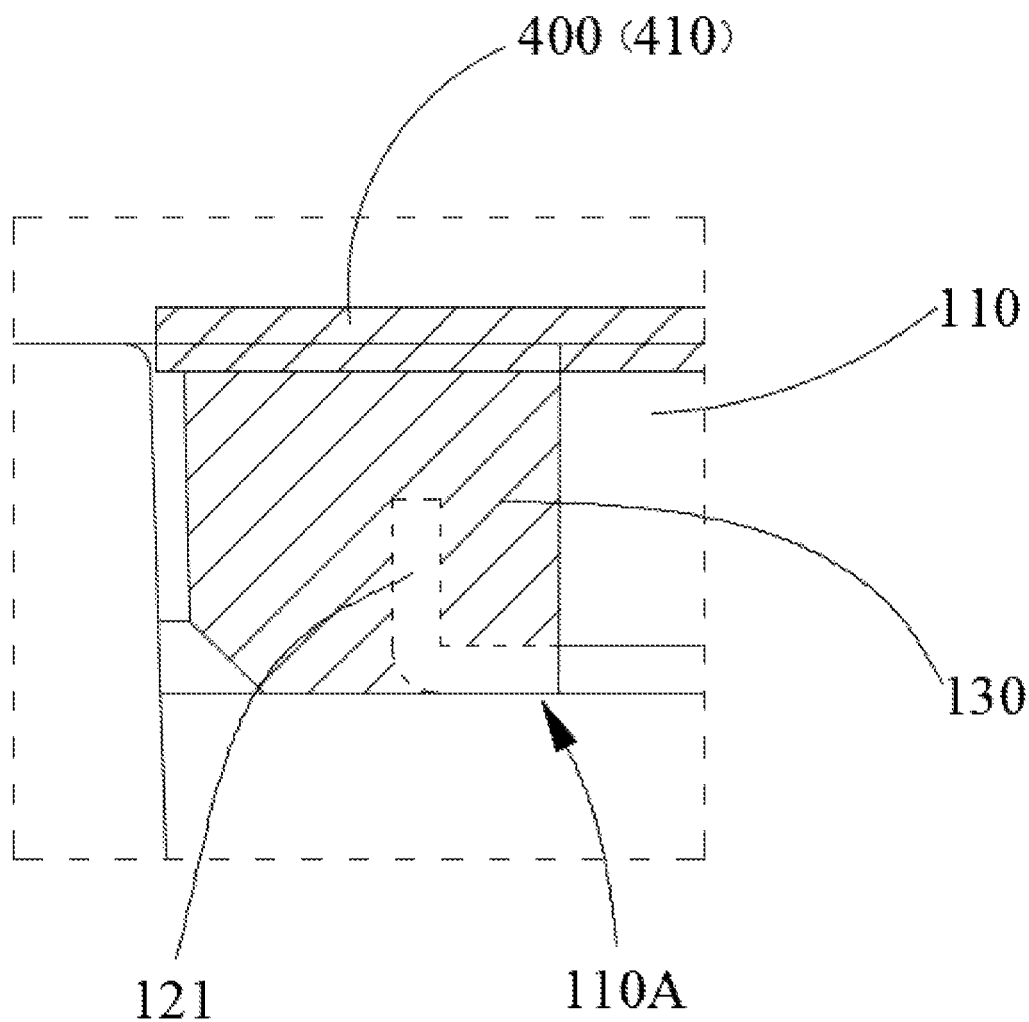
FIG. 4B is an enlarged schematic view of region D illustrated in FIG. 4A.

FIG. 4A is an enlarged schematic view of region C illustrated in FIG. 3. FIG. 4B is an enlarged schematic view of region D illustrated in FIG. 4A. The backlight module 100 in FIG. 4A includes a light guide plate 110, a metal frame 120, and a plastic ring 130. The light guide plate 110 defines a second via 110A. The metal frame 120 includes a support ring 121 received in the second via 110A. The plastic ring 130 is fixedly connected with the support ring 121 and received in the second via 110A. The plastic ring 130 defines an opening, the opening is served as the mounting through hole 110A and aligned with the first through hole 400A. The plastic ring 130 and the support ring 121 corporate with each other to limit the camera module 300.

In an implementation, the metal frame 120 is served as a supporting member to support and fix the light guide plate 110.

In an implementation, the support ring 121 is embedded in the plastic ring 130. The plastic ring 130 is in clearance fit with the camera module 300, with a gap of about 0.05 mm there between. When the camera module 300 is at least partially received in the opening of the plastic ring 130, it is possible to limit a position of the camera module 300, such that the camera module 300 can have a larger field of view, helping to improve the shooting performance of the camera module 300. When the camera module 300 is in a proper position, the support ring 121 can limit and fix the camera module 300 to prevent offset of the camera module 300 due to slight shaking and affecting shooting. This technical solution can realize positioning of the camera module 300 without complicated structures, helping to reduce costs.

Figure 5:
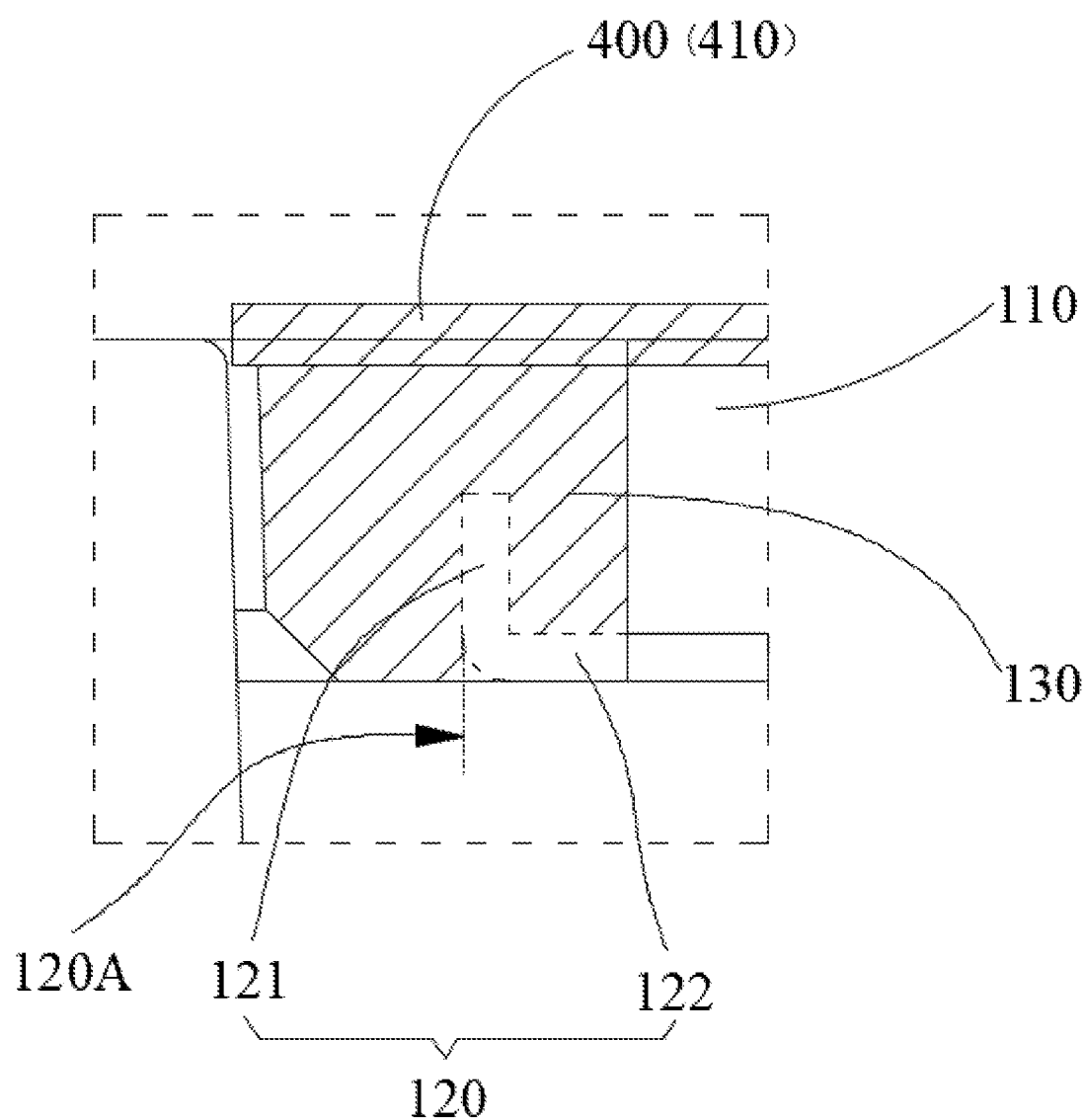
FIG. 5 is an enlarged schematic view of region D illustrated in FIG. 4A.

FIG. 5 is an enlarged schematic view of region D illustrated in FIG. 4A. As illustrated in FIG. 5), the metal frame 120 further includes a support plate 122. The support ring 121 protrudes from a surface of the support plate 122. The metal frame 120 defines a third via 120A extending through the support plate 122 and the support ring 121. The support plate 122 is used for carrying the light guide plate 110.

In an implementation, the metal frame 120 is formed with a flange structure. The metal frame 120 includes a base served as the support plate 122 and a protrusion portion served as the support ring 121. The metal frame 120 defines the third via 120A, and the third via 120A passes through the support plate 122 and the support ring 121. The support plate 122 supports the light guide plate 110 to avoid displacement of the light guide plate 110. The support ring 121 is sleeved on the side wall of the camera module 300 to limit the camera module 300.

Figure 6:
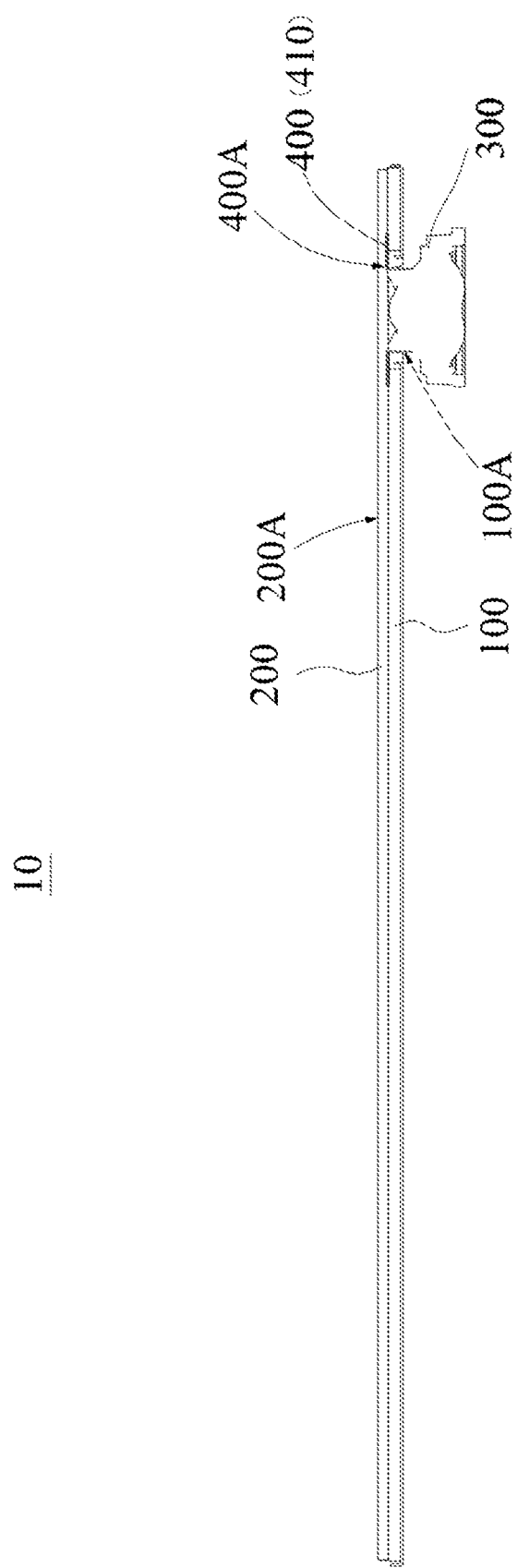
FIG. 6 is a schematic structural view of a screen assembly according to an implementation of the disclosure.

FIG. 6 is a schematic structural view of the screen assembly 10 according to an implementation of the disclosure. In this implementation, the screen assembly 10 includes the backlight module 100, the display panel 200, the camera module 300, and the light shielding member 400. The display panel 200 has a display region 200A. The backlight module 100 and the camera module 300 are disposed corresponding to the display region 200A. The backlight module 100 defines the mounting through hole 100A for at least partially receiving the camera module 300. The light shielding member 400 is sandwiched between the light shielding member 100 and the display panel 200. The light shielding member 400 is located at a position corresponding to the display region 200A of the display panel 200 and configured to block the light leakage of the display panel 400 and the backlight module 410 toward the camera module 300.

In an implementation, the display panel 200 is a liquid crystal display panel. The camera module 300 is a front camera.

In an implementation, the light shielding member 400 is the light shielding adhesive 410. The light shielding adhesive 410 is used for blocking the transmission of light. In an implementation, the light shielding adhesive 410 is a black adhesive.

In this implementation, the backlight module 100 and the camera module 300 are disposed corresponding to the display region 200A of the display panel 200. The light shielding adhesive 410 is sandwiched between the backlight module 100 and the display panel 200 and located at a position corresponding to the display region 200A of the display panel 200. Thus, it is possible to reduce the area of the non-display region of the display panel 200 and obtain a large screen-to-body ratio of the screen assembly 10. Furthermore, on the one hand, the light shielding adhesive 410 can bond the backlight module 100 and the display panel 200 together, and can shield structures in the backlight module 100 that do not need to be visible to the user, which is conductive to aesthetics of the screen assembly 10. On the other hand, the light shielding adhesive 410 can block the light leakage of the display panel 200 and the backlight module 100 toward the camera module 300, helping to increase the field of view of the camera module 300. Moreover, when the light shielding adhesive 410 is located in the display region 200A of the display panel 200, it is beneficial to improve the screen-to-body ratio of the screen assembly 10.

In order for the camera module 300 to receive lights, as one option, when shooting, a part of the display region 200A of the display panel 200 corresponding to the camera module 300 can be controlled to be transparent, such that lights from outside can pass through the transparent part of the display region 200A of the display panel 200 and transmit into the camera module 300. As another option, the part of the display region 200A of the display panel 200 corresponding to camera module 300 can be designed to have no liquid crystal, and upper and lower polarizers, which define through holes corresponding to the camera module 300, are provided. Alternatively, regions of the upper and lower polarizers corresponding to the camera module 300 are designed to be transparent.

Figure 7:
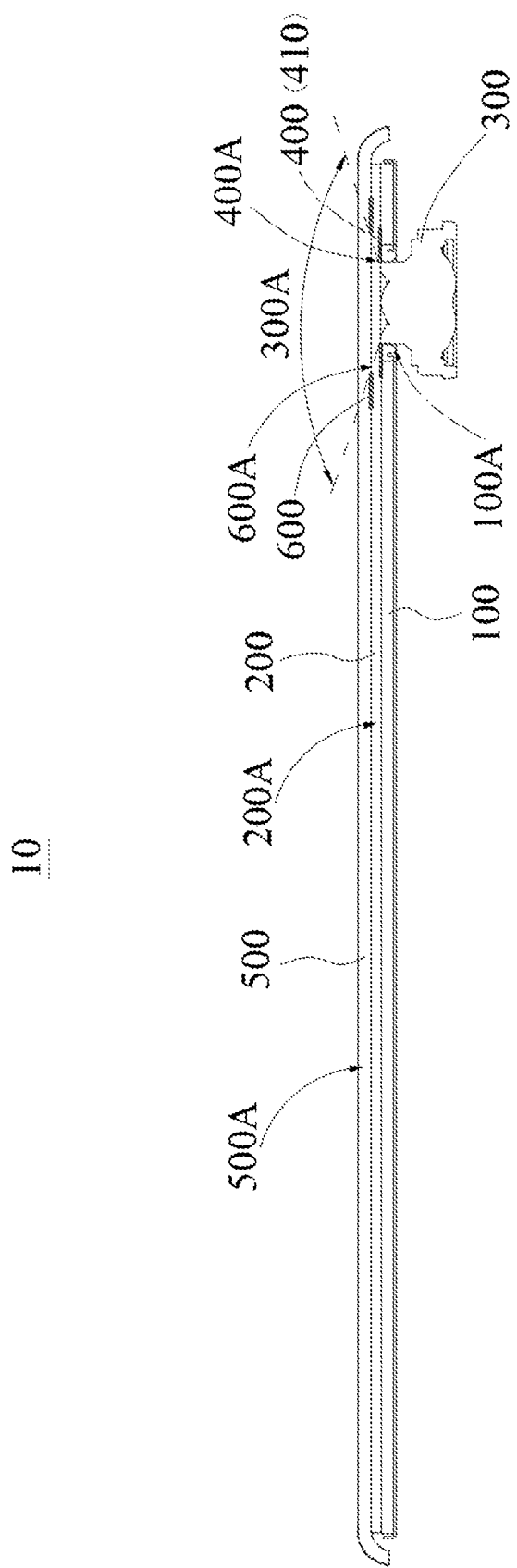
FIG. 7 is a schematic structural view of a screen assembly according to an implementation of the disclosure.

FIG. 7 is a schematic structural view of the screen assembly 10 according to an implementation of the disclosure. The screen assembly 10 in FIG. 7 is substantially identical with the screen assembly 10 in FIG. 6 in structure, except the screen assembly 10 in FIG. 7 further includes a cover plate 500 and an ink layer 600. The ink layer 600 is sandwiched between the display panel 200 and the cover plate 500. The ink layer 600 defines the second through hole 600A. The ink layer 600 is used for shielding the wires in the display panel 200.

In an implementation, the cover plate 500 has a transparency region 500A, and the transparency region 500A corresponds to the display region 200A of the display panel 200. "The transparency region 500A corresponds to the display region 200A" means that the transparency region 500A is located at a position which is substantially coincident with the display region 200A, and has substantially the same area as the display region 200A, such that light emitted from the display region 200A can pass through the transparency region 500A for display.

In an implementation, the camera module 300 has the light incident region 300A, and the light incident region 300A is conical in shape. As illustrated in FIG. 2B, the ink layer 600 and the shielding member 400 are respectively located at an edge of the light incident region 300A. The second through hole 600A of the ink layer 600 and the first through hole 400A of the shielding member 400 are respectively attached to the boundary of the light incident region 300A. The ink layer 600 and the shielding member 400 will not block the external light from entering the camera module 300, as a result, the camera module 300 can obtain a larger field of view, it helps to improve shooting performance of the camera module 300.

In an implementation, the ink layer 600 has a thickness less than the light shielding adhesive 410.

In this implementation, the ink layer 600 is sandwiched between the display panel 200 and the cover plate 500, and mainly used for shielding the wires in the display panel 200. The ink layer 600 can also be used to block the light leakage of the backlight module 100 and the display panel 200 toward the camera module 300, and shield the structures inside the backlight module 100, so as to prevent the internal structures from being visible to the users and affecting the aesthetics and the consistency in the appearance of the screen assembly 10. To this end, the ink layer 600 can have a thickness less than the preset value. The light shielding adhesive 410 is sandwiched between the display panel 200 and the backlight module 100. Thus, one the one hand, the light shielding adhesive 410 can bond the backlight module 100 and the display panel 200 together, and can shield the structures inside the backlight module 100, which is conductive to the aesthetics of the screen assembly 10. On the other hand, the light shielding adhesive 410 is used for blocking the light leakage of the backlight module 100 and the display panel 200 toward the camera module 300, it helps to increase the field of view of the camera module 300. To this end, the light shielding adhesive 410 can have a thickness greater than the preset value to bond the backlight module 100 and the display panel 200 together more firmly.

In an implementation, the second through hole 600A is aligned with the first through hole 400A. The diameter of the second through hole 600A is greater than the diameter of the first through hole 400A.

In an implementation, since the camera module 300 is symmetrical in structure, when the second through hole 600A is aligned with the first through hole 400A, on the one hand, it is possible to ensure that the second through hole 600A and the first through hole 400A will not block the external light from entering the camera module 300 and as a result, the camera module 300 can have a larger field of view; on the other hand, it is possible to further decrease the size of the light shielding adhesive 410 and the ink layer 600, helping to reduce the proportion of the light-shield adhesive 410 and the ink layer 600 occupying the display panel 200, and in turn helping to increase the screen-to-body ratio of the screen assembly 10.

In an implementation, the field of view of the camera module 300 is conical in shape, which diverges from the camera module 300 toward a direction away from the display panel 200. Therefore, when the diameter of the second through hole 600A is greater than the diameter of the first through hole 400A, it is possible to ensure that the ink layer 600 will not block the external light from entering the camera module 300. At the same time, the ink layer 600 can also reduce the light leakage of the display panel 200 toward the camera module 300, as well as shield the metal wires and the like in the display panel 200. As such, on the one hand, the camera module 300 can have a larger field of view. On the other hand, since the metal wires in the display panel 200 are shielded, the internal structures of the display panel 200 are invisible to the users when viewing from the outside of the screen assembly 10, and thus the consistency in the appearance of the screen assembly 10 is improved.

In another implementation, the projection of the ink layer 600 on the cover plate 500 partially overlaps with the projection of the light shielding adhesive 410 on the cover plate 500. In yet another implementation, the projection of the ink layer 600 on the cover plate 500 at least partially overlaps with the projection of the light shielding adhesive 410 on the cover plate 500.

In this implementation, when the projection of the ink layer 600 on the cover plate 500 partially overlaps with the projection of the light shielding adhesive 410 on the cover plate 500, on the one hand, it is possible to ensure that the structures below the light shielding adhesive 410 and the ink layer 600 are completely shielded and the beautiful and neat appearance of the screen assembly 10; on the other hand, the light shielding adhesive 410 and the ink layer 600 cooperate with each other to reduce the light leakage of the display panel 200 and the backlight module 100 toward the camera module 300, helping to improve the shooting performance of the camera module 300.

In another implementation, the ink layer 600 is disposed on the surface of the cover plate 500 close to the display panel 200, that is, the ink layer 600 is coated on the cover plate 500. On the one hand, the ink layer 600 can block the light leakage of the display panel 200 and the backlight module 100 toward the camera module 300, and on the other hand, the ink layer 600 can block the light reflected by the display panel 200, the backlight module 100, and the camera module 300 from passing through the cover plate 500. If the light reflected by the display panel 200, the backlight module 100, and the camera module 300 passes through the cover plate 500 to enter the eyes of the user, the internal structures of the screen assembly 10 are visible to the user, which is unfavorable for the aesthetics and the consistency in the appearance of the screen assembly 10.

Alternatively, the ink layer 600 is disposed on a surface of the display panel 200 close to the cover plate 500, that is, the ink layer 600 is coated on the display panel 200.

In an implementation, the light shielding member 400 is disposed on the surface of the display panel 200 close to the backlight module 100. When the light shielding member 400 is the light shielding adhesive 410, the light shielding adhesive 410 is coated on the surface of the display panel 200. On the one hand, the light shielding adhesive 410 can block the light leakage of the backlight module 100 toward the camera module 300, and on the other hand, the light shielding adhesive 410 can block the light reflected by the backlight module 100 and the camera module 300 from passing through the cover plate 500. If the light reflected by the backlight module 100 and the camera module 300 passes through the display panel 200 and the cover plate 500 and enters the eyes of the user, the internal structures of the screen assembly 10 are visible to the user, which is unfavorable for the aesthetics and the consistency in the appearance of the screen assembly 10.

Alternatively, the light shielding member 400 is disposed on the surface of the backlight module 100 close to the display panel 200.

Figure 8:
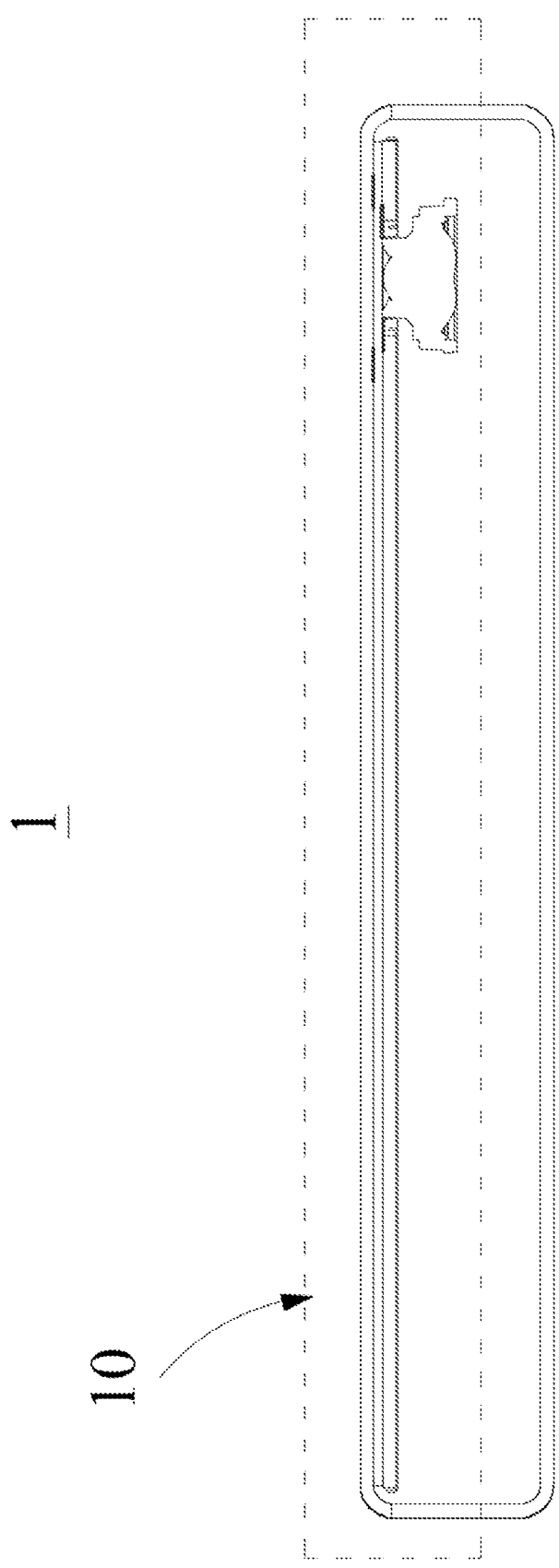
FIG. 8 is a schematic structural view of an electronic device according to an implementation of the disclosure.

FIG. 8 is a schematic structural view of an electronic device 1 according to an implementation of the disclosure. The electronic device 1 includes the screen assembly 10 provided according to any of the above-mentioned implementation.

The electronic device 1 may be any device with communication and storage functions. The electronic device 1 may be a smart device with network functions such as a tablet computer, a mobile phone, an e-reader, a remote control, a personal computer (PC), a notebook computer, a vehicle-mounted device, a network TV, a wearable device, and the like.

Figure 9:
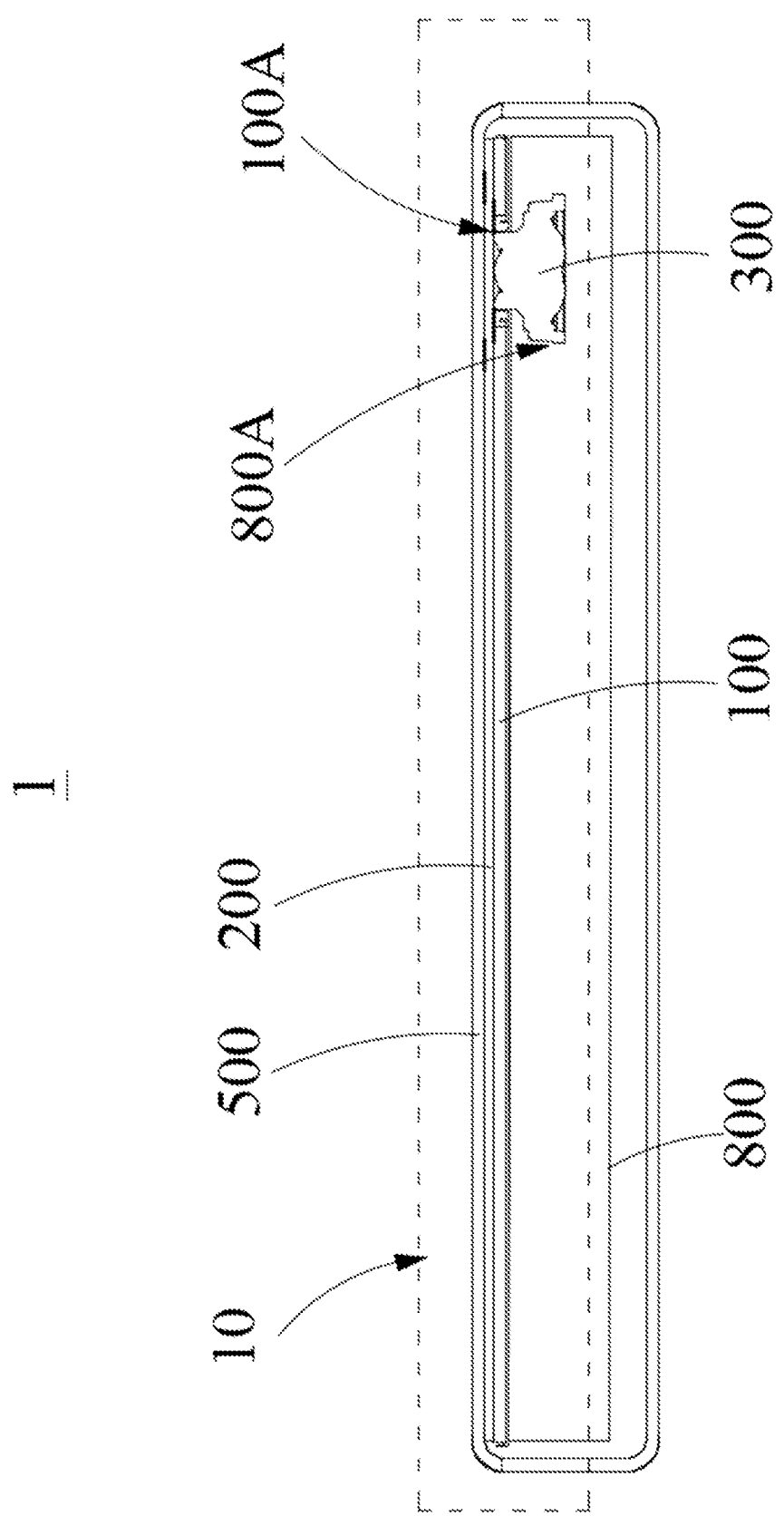
FIG. 9 is a schematic structural view of an electronic device according to an implementation of the disclosure.

FIG. 9 is a schematic structural view of the electronic device 1 according to an implementation of the disclosure. The electronic device 1 in FIG. 9 is substantially identical with the electronic device 1 in FIG. 8 in structure, except in FIG. 9, the electronic device 1 further includes a front housing 800 for carrying the screen assembly 10. The front housing 800 is disposed on one of two opposite sides of the backlight module 100, and the display panel 200 is disposed on the other one of the two opposite sides of the backlight module 100. The front housing 800 defines a receiving cavity 800A at a position corresponding to the mounting through hole 100A, the receiving cavity 800A is used for receiving the camera module 300 to limit the camera module 300. It is noted that, as illustrated in FIG. 10, when the camera module 300 is received in the receiving cavity 800A, an inner wall of the receiving cavity 800A fits with an outer contour of the camera module 300.

In an implementation, the front housing 800 is served as a frame of the electronic device 1. The front housing 800 defines a receiving cavity 800A facing the mounting through hole 100A. The receiving cavity 800A is used for receiving the camera module 300 to limit the camera module 300. In this technical solution, the receiving cavity 800A is defined in the front housing 800 to limit the camera module 300, such that the camera module 300 can be fixed without complicated mechanical structures, which is beneficial to reduce the costs.

Figure 10:
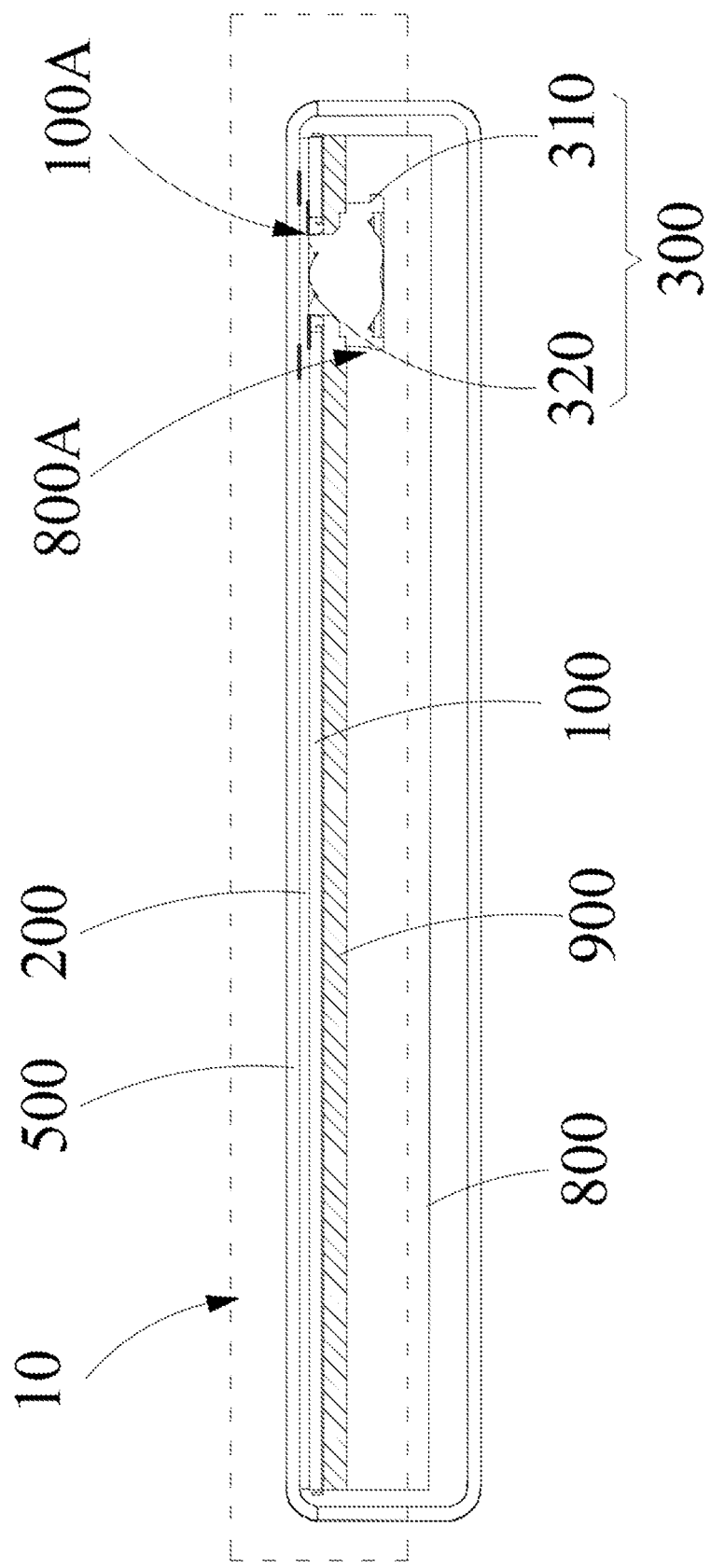
FIG. 10 is a schematic structural view of an electronic device according to an implementation of the disclosure.

FIG. 10 is a schematic structural view of the electronic device 1 according to an implementation of the disclosure. The screen assembly 10 in FIG. 10 is substantially identical with the screen assembly 10 in FIG. 9 in structure, except in FIG. 10, the electronic device 1 further includes a sealing layer 900. The camera module 300 includes an outer housing 310 and optical elements 320 received in the outer housing 310. The sealing layer 900 is sandwiched between the backlight module 100 and the front housing 800, and is attached to the outer housing 310 to seal and protect the optical elements 320 of the camera module 300.

In an implementation, the sealing layer 900 may be waterproof foam. The sealing layer 900 is used for protecting the electronic device 1 from water and dust, which is beneficial to prolong a service life of the electronic device 1. Furthermore, in addition to waterproofing, dustproofing, and sealing, the sealing layer 900 is also used for shock absorption, sound absorption, and cushioning, and the like. It is possible to avoid unintended vibration of the camera module 300, to absorb noise generated inside the electronic device 1, and to provide buffer protection for the electronic device 1, and so on.

Disclosed above are merely specific implementations of the disclosure, but the protection scope of the disclosure is not limited thereto. Within the technical scope disclosed in the disclosure, various equivalent modifications or substitutions shall be readily appreciated by those skilled in the art and within the protection scope of the disclosure. Therefore, the protection scope of the disclosure shall be subject to the protection scope of the claims.

What is claimed is:

1. A screen assembly, comprising:
   a display panel;
   a camera module;
   a backlight module stacked with the display panel and defining a mounting through hole for at least partially receiving the camera module; and
   a light shielding member sandwiched between the backlight module and the display panel and defining a first through hole through which the camera module extends, wherein the light shielding member is configured to block light leakage of the display panel and the backlight module toward the camera module;
   the backlight module comprising a light guide plate, a metal frame, and a plastic ring, wherein
      the light guide plate defines a second via, the metal frame comprises a support ring received in the second via, and the plastic ring is fixedly connected with the support ring and received in the second via;
      the plastic ring defines an opening, the opening is served as the mounting through hole and aligned with the first through hole; and
      the plastic ring and the support ring cooperate with each other to limit the camera module.

2. The screen assembly of claim 1, wherein the light shielding member comprises a light shielding adhesive.

3. The screen assembly of claim 2, wherein the light shielding adhesive comprises an adhesive body, the adhesive body is used for bonding the backlight module and the display panel.

4. The screen assembly of claim 3, wherein
   the light shielding adhesive further comprises a protrusion portion in an annular shape, the protrusion portion extends from a surface of the adhesive body and is disposed on a side of the adhesive body away from the backlight module;
   the light shielding adhesive defines a first via extending through the protrusion portion and the adhesive body; and
   the protrusion portion is sleeved on the camera module and attached to a side wall of the camera module.

5. The screen assembly of claim 1, further comprising a cover plate and an ink layer, wherein the ink layer is sandwiched between the display panel and the cover plate, defines a second through hole, and is used for shielding wires in the display panel.

6. The screen assembly of claim 5, wherein the second through hole is aligned with the first through hole and has a diameter greater than the first through hole.

7. The screen assembly of claim 5, wherein a projection of the ink layer on the cover plate partially overlaps with a projection of the light shielding member on the cover plate.

8. The screen assembly of claim 5, wherein
   the ink layer is disposed on a surface of the cover plate close to the display panel; or
   the ink layer is disposed on a surface of the display panel close to the cover plate.

9. The screen assembly of claim 5, wherein an optically clear adhesive is sandwiched between the cover plate and the display panel and used for fixedly connecting the cover plate and the display panel.

10. The screen assembly of claim 1, wherein
    the light shielding member is disposed on a surface of the display panel close to the backlight module; or
    the light shielding member is disposed on a surface of the backlight module close to the display panel.

11. The screen assembly of claim 1, wherein
    the metal frame further comprises a support plate, the support ring protrudes from a surface of the support plate;
    the metal frame defines a third via extending through the support plate and the support ring; and
    the support plate is used for carrying the light guide plate.

12. The screen assembly of claim 1, wherein the support ring is embedded in the plastic ring.

13. A screen assembly, comprising:
    a camera module;
    a backlight module defining a mounting through hole for at least partially receiving the camera module;
    a display panel comprising a display region, wherein the backlight module and the camera module are disposed corresponding to the display region;
    a light shielding member sandwiched between the backlight module and the display panel and defining a first through hole through which the camera module extends, wherein the light shielding member is located at a position corresponding to the display region of the display panel and configured to block light leakage of the display panel and the backlight module toward the camera module; and
    a cover plate and an ink layer, wherein the ink layer is sandwiched between the display panel and the cover plate, defines a second through hole, and is used for shielding wires in the display panel, and wherein the second through hole is aligned with the first through hole and has a diameter greater than the first through hole.

14. The screen assembly of claim 13, wherein the light shielding member comprises a light shielding adhesive.

15. An electronic device, comprising:
a screen assembly comprising:
   a display panel;
   a camera module;
   a backlight module stacked with the display panel and defining a mounting through hole for at least partially receiving the camera module;
   a light shielding member sandwiched between the backlight module and the display panel and defining a first through hole through which the camera module extends, wherein the light shielding member is configured to block light leakage of the display panel and the backlight module toward the camera module; and
   a cover plate and an ink layer, wherein the ink layer is sandwiched between the display panel and the cover plate, defines a second through hole, and is used for shielding wires in the display panel, and wherein an optically clear adhesive is sandwiched between the cover plate and the display panel and used for fixedly connecting the cover plate and the display panel;
   wherein the backlight module comprises a light guide plate, a metal frame, and a plastic ring, wherein the light guide plate defines a second via, the metal frame comprises a support ring received in the second via, and the plastic ring is fixedly connected with the support ring and received in the second via;
   the plastic ring defines an opening, the opening is served as the mounting through hole and aligned with the first through hole; and
   the plastic ring and the support ring cooperate with each other to limit the camera module; and
a front housing for carrying the screen assembly.

16. The electronic device of claim 15, wherein
the front housing and the display panel are respectively disposed on two opposite sides of the backlight module; and
the front housing defines a receiving cavity at a position corresponding to the mounting through hole, the receiving cavity is used for receiving the camera module to limit the camera module.

17. The electronic device of claim 16, wherein
the electronic device further comprises a sealing layer;
the camera module comprises an outer housing and optical elements received in the outer housing; and
the sealing layer is sandwiched between the backlight module and the front housing, and is attached to the outer housing to seal and protect the optical elements of the camera module.

* * * * *